United States Patent [19]
Coveley

[11] Patent Number: 5,586,048
[45] Date of Patent: Dec. 17, 1996

[54] INTELLIGENT WALL SWITCH

[75] Inventor: Michael Coveley, North York, Canada

[73] Assignee: Vigilight Inc., King City, Canada

[21] Appl. No.: 310,320

[22] Filed: Sep. 22, 1994

Related U.S. Application Data

[63] Continuation-in-part of Ser. No. 898,307, Jun. 16, 1992, abandoned.

[51] Int. Cl.[6] .................................................. G05B 13/02
[52] U.S. Cl. .......................... 364/492; 364/480; 340/552; 340/331; 340/528; 307/117; 315/307; 315/159
[58] Field of Search ...................................... 364/492, 480, 364/483, 516, 575, 581; 340/541, 552, 565, 600, 330, 331, 528, 567, 691; 307/117; 315/307, 150, 151, 158, 159

[56] References Cited

U.S. PATENT DOCUMENTS

| | | | |
|---|---|---|---|
| 4,510,488 | 4/1985 | St. Jean et al. | 340/567 |
| 4,575,659 | 3/1986 | Pezzolo et al. | 315/159 |
| 4,649,323 | 3/1987 | Pearlman et al. | 315/307 |
| 4,660,024 | 4/1987 | McMaster | 340/522 |
| 4,695,739 | 9/1987 | Pierce | 307/141 |
| 4,703,171 | 10/1987 | Kahl et al. | 250/221 |
| 4,719,363 | 1/1988 | Gallacher | 307/117 |
| 4,772,875 | 9/1988 | Maddox et al. | 340/522 |
| 4,823,051 | 4/1989 | Young | 315/155 |
| 4,928,085 | 5/1990 | DuRand, III et al. | 340/544 |
| 4,937,702 | 6/1990 | Kurihara | 361/179 |
| 4,943,800 | 7/1990 | Ikeda et al. | 340/567 |
| 4,949,074 | 8/1990 | D'Ambrosia et al. | 340/522 |
| 4,952,911 | 8/1990 | D'Ambrosia et al. | 340/557 |
| 4,967,183 | 10/1990 | D'Ambrosia et al. | 340/552 |
| 5,015,994 | 5/1991 | Hoberman et al. | 340/567 |
| 5,019,802 | 5/1991 | Brittain et al. | 340/522 |
| 5,023,593 | 6/1991 | Brox | 340/522 |
| 5,077,548 | 12/1991 | Dipoala | 340/522 |
| 5,099,193 | 3/1992 | Moseley et al. | 323/324 |
| 5,107,249 | 4/1992 | Johnson | 340/541 |
| 5,128,654 | 7/1992 | Griffin et al. | 340/567 |
| 5,130,613 | 7/1992 | Szuba | 315/291 |
| 5,153,560 | 10/1992 | Ichikawa | 340/522 |
| 5,189,393 | 2/1993 | Hu | 340/522 |
| 5,227,762 | 7/1993 | Guidette et al. | 340/310 R |
| 5,267,427 | 1/1994 | Peterson | 340/522 |
| 5,276,427 | 1/1994 | Peterson | 340/522 |
| 5,281,961 | 1/1994 | Elwell | 340/825 |
| 5,293,097 | 3/1994 | Elwell | 315/154 |
| 5,386,210 | 1/1995 | Lee | 340/567 |

*Primary Examiner*—Emanuel T. Voeltz
*Assistant Examiner*—Kyle J. Choi
*Attorney, Agent, or Firm*—Sim & McBurney

[57] ABSTRACT

An intelligent wall switch incorporates a passive infrared sensor and a pressure pulse-wave sensor. A microcontroller monitors the sensor signals generated by the infrared sensor and the pressure pulse-wave sensor and calculates a weighted sum of the signals generated by the sensors. If the weighted sum calculated by the microcontroller exceeds a preset threshold the intelligent wall switch generates a signal indicative of human presence.

17 Claims, 13 Drawing Sheets

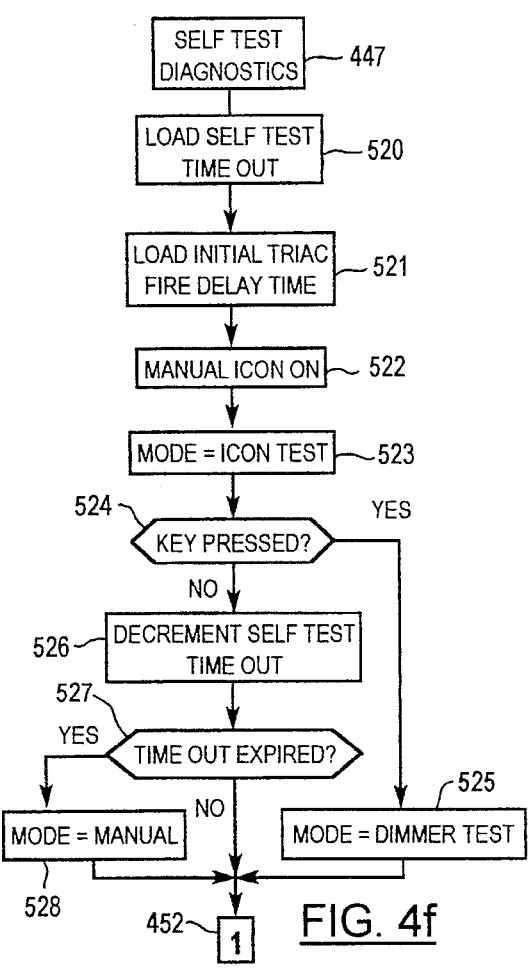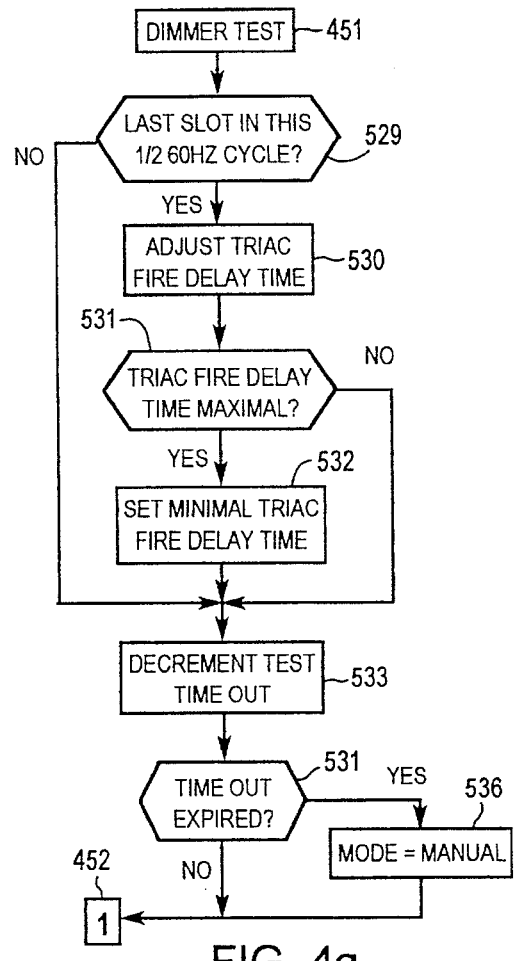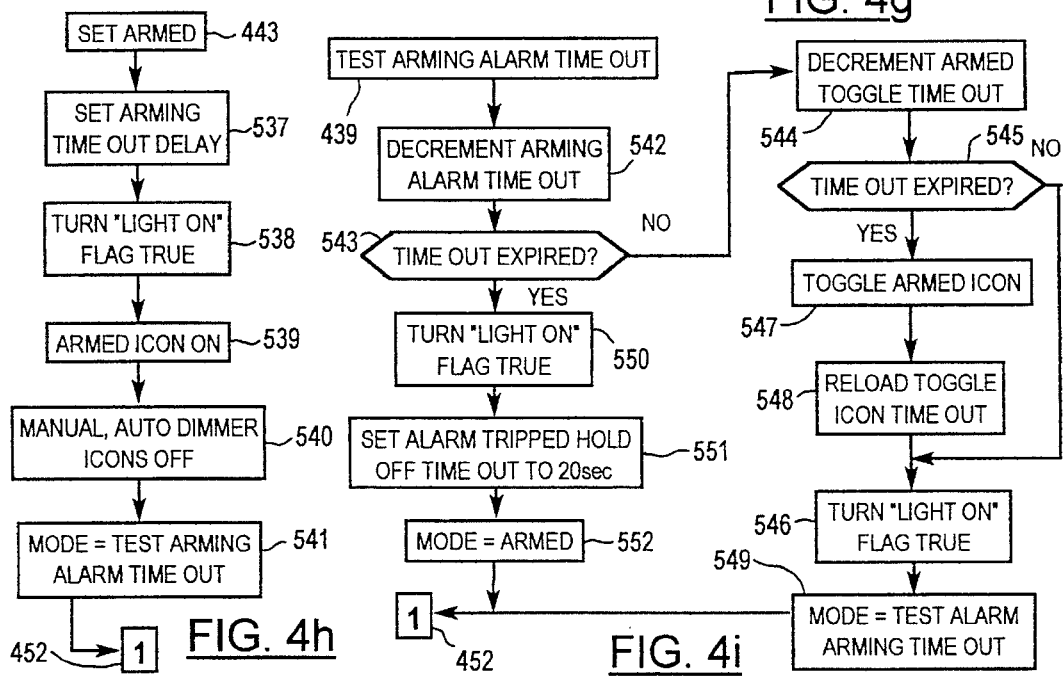

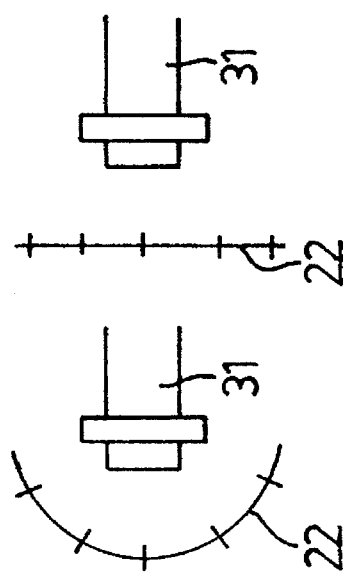
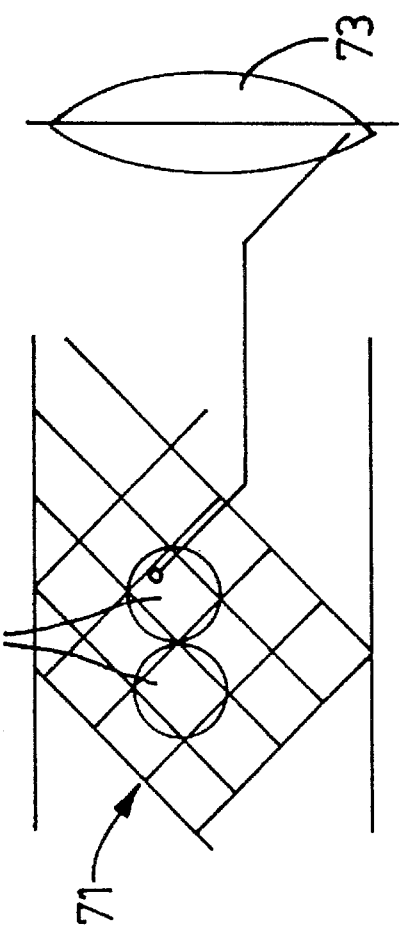

phonics and background noise in the case of pressure pulse-wave detection, as well as being vulnerable to rapid environmental changes (i.e. temperature, humidity, wind, ambient light, etc.).

INTELLIGENT WALL SWITCH

CROSS-REFERENCE TO RELATED APPLICATION

This is a continuation-in-part of application Ser. No. 07/898,307 filed Jun. 16, 1992 now abandoned.

FIELD OF THE INVENTION

The present invention relates generally to wall switches and more particularly to an intelligent wall switch that detects and monitors human presence and in response automatically activates luminaries.

BACKGROUND OF THE INVENTION

According to the prior art, wall switches are known for turning on and turning off luminaries such as lamps, overhead lighting, etc. Furthermore, it is known to include dimmer switches and rheostats for controlling the level of brightness of such luminaries when they are turned on.

More recently, circuits have been developed for detecting the presence of a person in a room and in response controlling ancillary systems such as lighting, security alarms, etc. For example, U.S. Pat. No. 5,015,994 (Hoberman et al) discloses a security light controlled by a motion detector. According to this system, a photoelectric device is provided such that the security light is illuminated in response to motion only when there is an insufficient amount of ambient light available from other sources.

U.S. Pat. No. 5,153,560 (Ichikawa) discloses an apparatus for detecting the presence of a person inside of a room having a door. The disclosed system incorporates an infrared sensor and a pressure pulse-wave sensor to determine when the door has been opened. Logic circuitry is provided for receiving signals from the infrared sensor and from the pressure pulse-wave sensor such that when the infrared sensor is triggered after the pressure pulse-wave sensor, the logic device produces a signal indicating entry of a person, whereas when the pressure pulse-wave sensor is triggered after the infrared sensor, the logic device produces a signal indicating the exit of a person from the room. In this manner, the signals may be processed by the logic circuitry to ascertain the presence or absence of a person.

Additional prior art is known directed to various motion detection techniques, such as U.S. Pat. No. 4,823,051 (Young), U.S. Pat. No. 4,447,726 (Mudge et al), U.S. Pat. No. 4,660,024 (McMaster), U.S. Pat. No. 4,952,911 (D'Ambrosia et al), U.S. Pat. No. 4,967,183 (D'Ambrosia et al), U.S. Pat. No. 5,019,802 (Brittain et al), U.S. Pat. No. 5,023,593 (Brox), U.S. Pat. No. 5,276,427 (Peterson), U.S. Pat. No. 4,772,875 (Maddox et al), U.S. Pat. No. 4,510,488 (St. Jean et al), U.S. Pat. No. 4,494,074 (D'Ambrosia et al), U.S. Pat. No. 4,928,085 (DuRand, III et al), U.S. Pat. No. 5,077,548 (Dipoala), U.S. Pat. No. 5,107,249 (Johnson), U.S. Pat. No. 5,281,961 (Elwell), U.S. Pat. No. 4,943,800 (Ikeda et al).

The above-discussed prior art systems disclose various applications of infrared radiation detection and pressure pulse-wave detection for intrusion systems, and environmental control systems. However, the existing prior art systems allow for only limited energy conservation and utilize relatively unsophisticated sensors. More particularly, in many existing systems a fixed threshold is set against which the infrared, pressure pulse-wave, etc., sensor signals are compared. However, the fixed threshold established in such prior art systems generally drifts over time, such that the prior art devices are vulnerable to micro-

SUMMARY OF THE INVENTION

According to the present invention, an intelligent wall switch is provided incorporating a passive infrared sensor, a pressure pulse-wave sensor and a microcontroller for monitoring the sensor signals provided by the infrared sensor and pressure pulse-wave sensor and in response calculating a weighted sum of the digitized signals generated by the sensors. The intelligent wall switch generates a signal indicative of human presence only if the weighted sum exceeds a preset threshold. Thus, in contrast with prior art systems, the intelligent wall switch of the present invention eliminates false spurious activation due to microphonics and background noise, rapid environmental changes, voltage drift, etc.

BRIEF DESCRIPTION OF THE DRAWINGS

A detailed description of the preferred embodiment of the present invention is provided herein below with reference to the following drawings, in which:

FIGS. 4a–4k are flow charts showing program flow for a microcontroller of the wall switch according to the present invention;

FIG. 5A–5D show a promulgated lens for focussing thermal radiation on an infrared sensor of the intelligent wall switch, according to the preferred embodiment;

DETAILED DESCRIPTION OF THE PREFERRED EMBODIMENT

Figure 1:
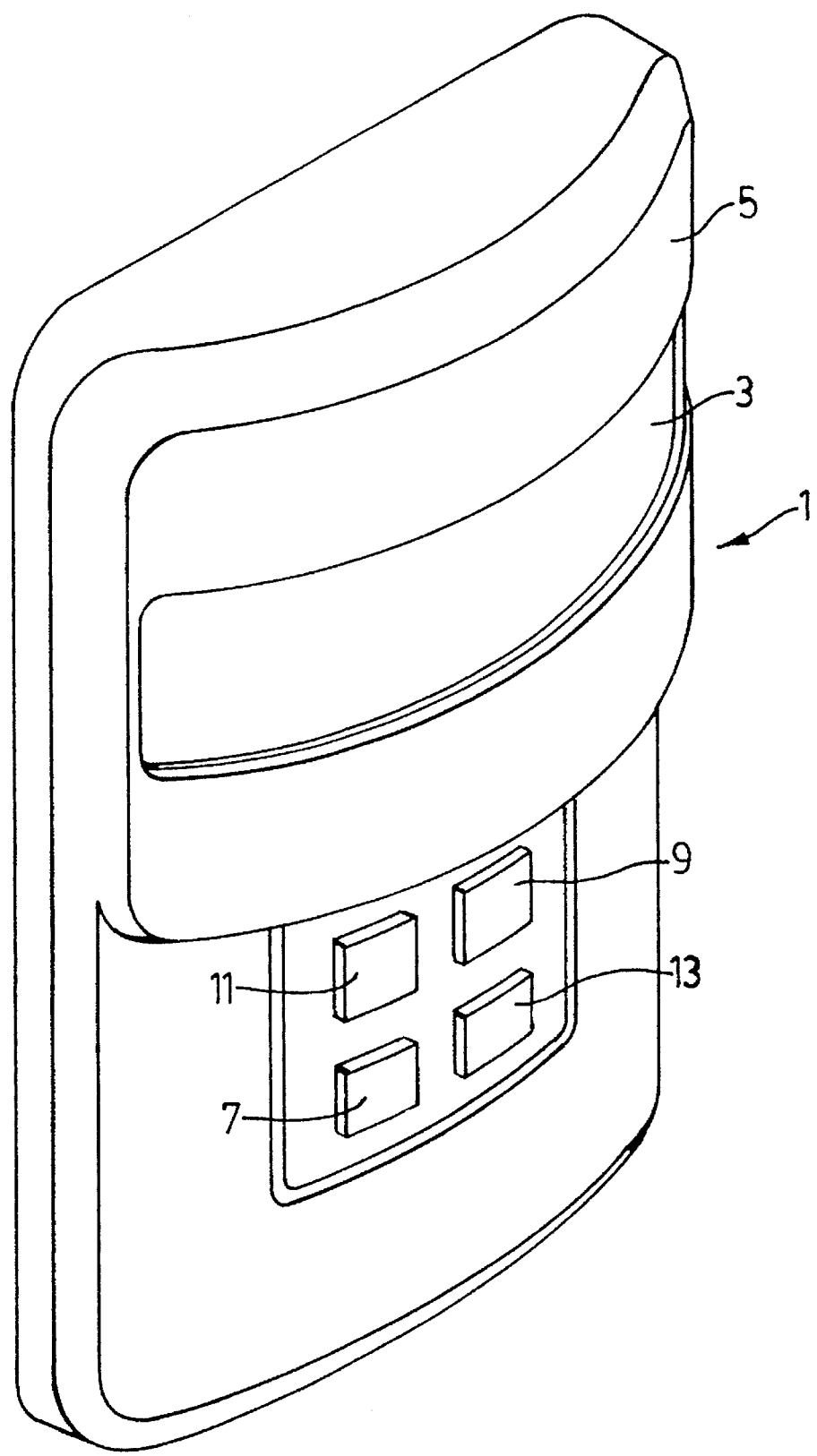
FIG. 1 is a perspective view of an intelligent wall switch according to a first embodiment of the invention.

Turning to FIG. 1, an intelligent wall switch is shown according to a first embodiment of the invention. The switch comprises a housing 1 for storing a printed circuit board, a passive infrared sensor, pressure pulse-wave sensor and ambient light sensor, all discussed in greater detail below with reference to FIG. 3. The passive infrared sensor (PIR) and pressure pulse-wave sensor (PPW) are mounted behind a window in the form of a double polyethylene facade semi-cylindrical lens 3. An ABS plastic bezel and face plate 5 surround and encapsulate the window or lens 3.

Below the window 3, four control buttons are provided, as follows: ON/OFF switch 7, AUTO switch 9, DIMMER switch 11 and ARMED switch 13. The four control buttons 7–13 may be depressed to initiate various operating modes of the switch. Depressing ON/OFF switch 7 causes a luminary (not-shown) connected to the wall switch to be manually turned on or turned off. However, as discussed in greater detail below, the turning on and turning off of the luminary is made gradual (ie. glow-up and glow-down) to the last setting established for the wall switch in the DIMMER mode. Furthermore, the gradual turning on and gradual turning off of the luminary is performed in synchronism with the zero-crossings of the AC power input to the luminary and wall switch, as discussed in greater detail below. Depressing AUTO switch 9 causes the luminary to turn on automatically in the presence of a human in the vicinity of the switch and to turn off in the absence of a human in the vicinity of the switch. Depressing the DIMMER switch 11 causes the luminary to switch gradually from either off to on or from on to off, depending on whether the luminary is initially on or off. Depressing ALARM switch 13 causes the intelligent wall switch to operate in an ALARM mode for causing the luminary to flash at an unpleasant rate in response to detecting human presence in the vicinity of the switch, as discussed in greater detail below. In response to simultaneously depressing switches 9 and 13, the system controls operation of the luminary in accordance with a recorded switching sequence (COPY-CAT mode) corresponding to a predetermined period of time (e.g. 72 hours), as discussed in greater detail below.

Figure 2A:
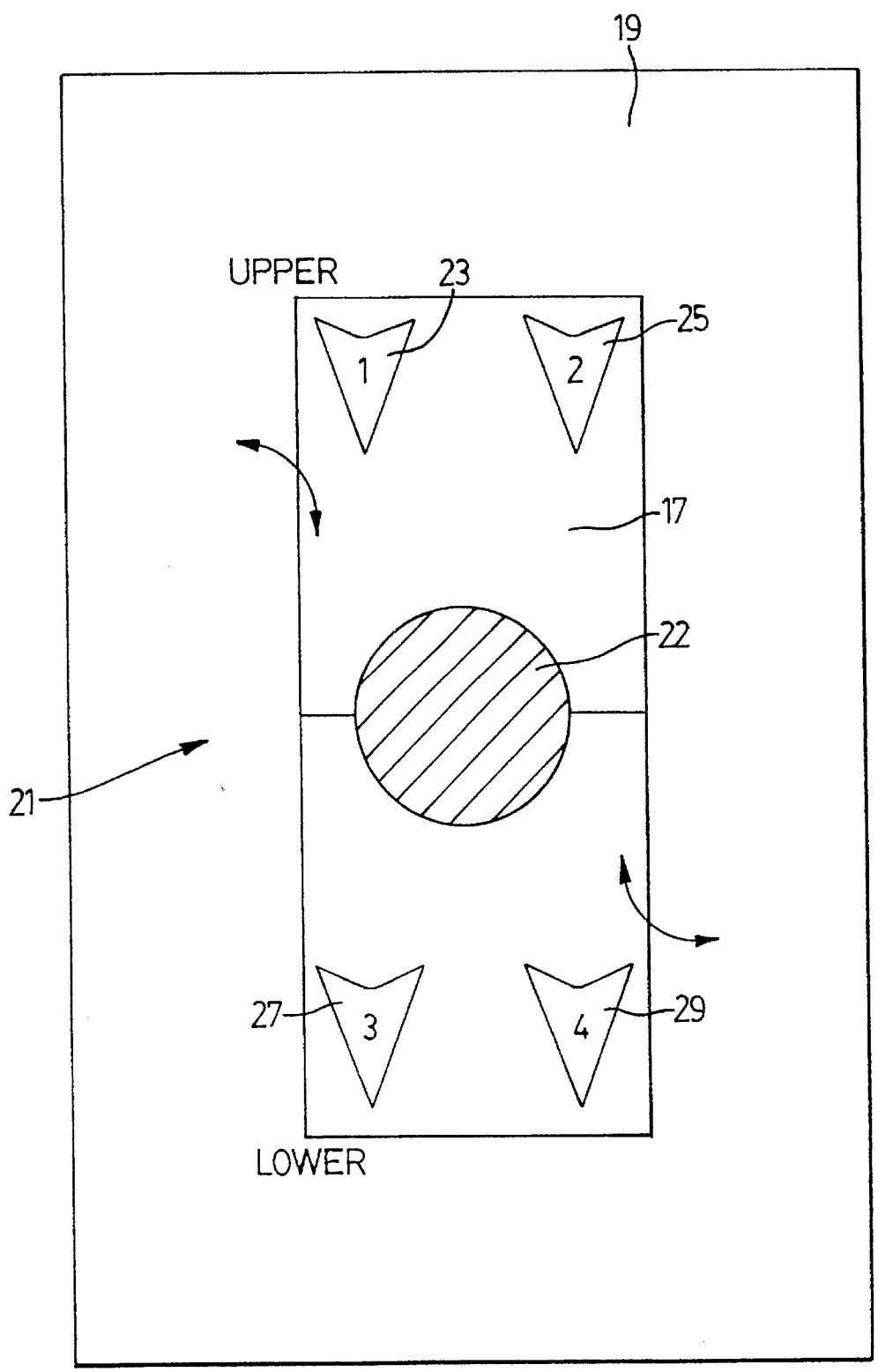
FIG. 2A is a front view of an intelligent wall switch according to a second embodiment of the invention.

Turning briefly to FIG. 2A, a second, preferred, embodiment of the intelligent wall switch is shown wherein the four buttons 7–13 are replaced with a single rocker switch 17 which pivots around an axis 21, and which is surrounded by a cover plate 19, according to well known design. The PIR sensor is mounted behind a multi-element lens 22 (see also FIG. 5), and the PPW sensor is mounted behind the cover plate 19.

A plurality of illuminated legends or icons 23, 25, 27 and 29 are disposed at four corners of the rocker switch, for indicating different modes of operation of the intelligent wall switch. Specifically, icon 23 (amber coloured) depicts activation of the DIMMER mode of operation, icon 25 (green coloured) depicts activation of the AUTO mode of operation, icon 27 (yellow coloured) depicts activation of the ON/OFF mode of operation, and icon 29 (red coloured) depicts activation of the ALARM mode of operation. According to a successful prototype, the movement-to-contact distance for rocker switch 17 is approximately a ⅛" throw.

In the embodiment of FIG. 2A, the various operating modes of the intelligent wall switch are initiated by different combinations of "taps" on rocker switch 17. As indicated above, the single rocker switch 17 is provided with one contact at the top ("on" position) and one contact at the bottom ("off" position).

Figure 2B:
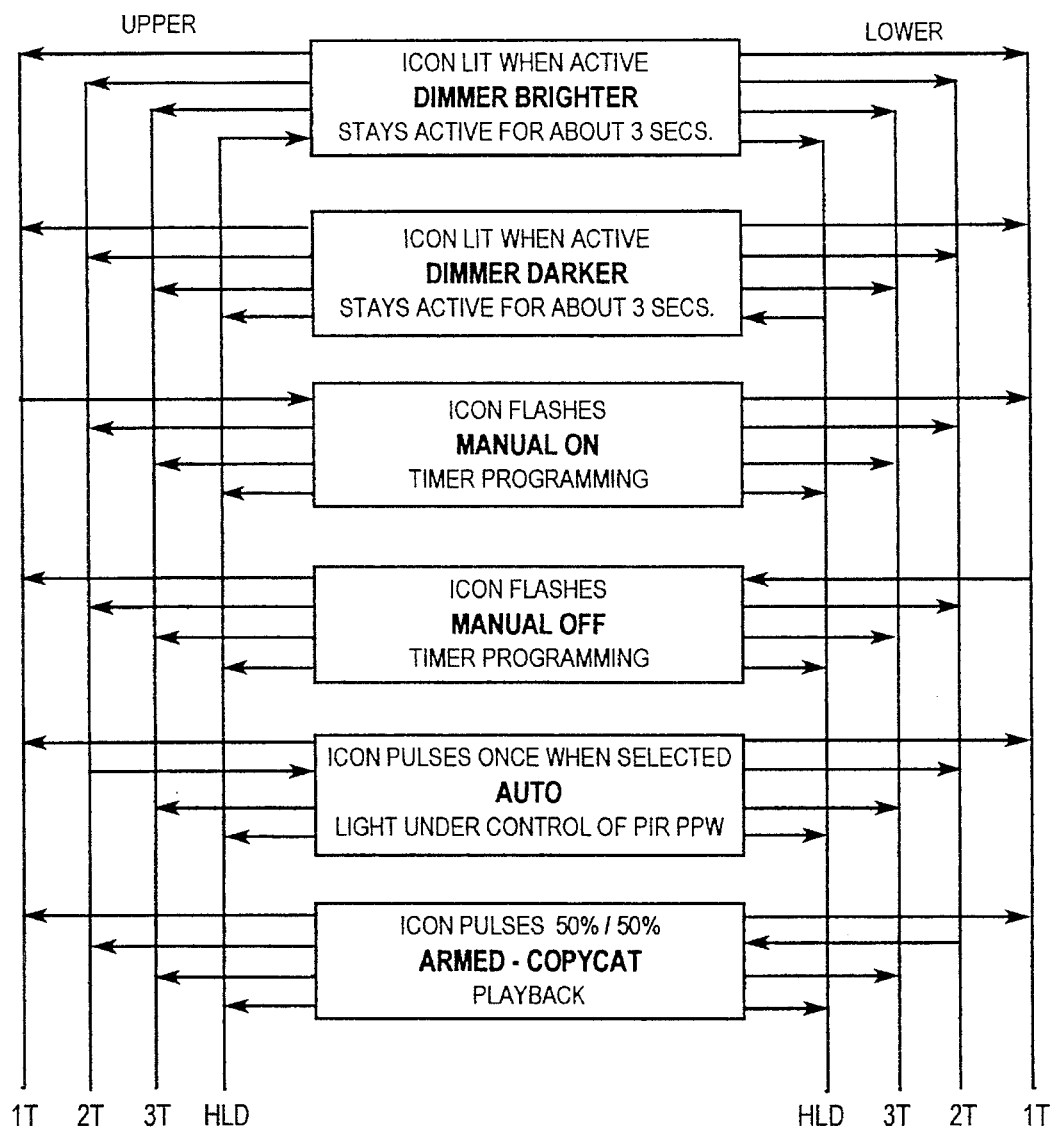
FIG. 2B is a state diagram showing tapping action required to initiate various function of the intelligent wall switch of FIG. 2A.

A summary of the various modes of operation and functions performed by the intelligent wall switch in accordance with these modes is provided below in Table 1, and in the state diagram of FIG. 2B.

TABLE 1

| FUNCTION | PREVAILING CONDITION | ACTION REQUIRED |
| --- | --- | --- |
| COPY-CAT REPLAY [ARMED] | When this FUNCTION is initially selected, icon 29 (red) flashes, luminary remains ON for the duration of a 60 sec exit delay, allowing user time to leave. After the exit delay has elapsed, the luminary turns off and icon 29 remains steady on indicating the switch is ARMED. Once ARMED, the wall switch monitors for human presence. If human presence is detected, FUNCTION switches to ALARM (see below). | TWO TAPS LOWER |
| ALARM | If human presence is detected, icon 29 (red) flashes for 20 secs (ie. ALARM-TRIP-DELAY) which gives the user time to unlock this feature. Failure to unlock will result in the luminary flashing on glow-up and turning off during dim-down, repeatedly for 2 mins. After 2 mins the system reverts to original status, COPY-CAT-REPLAY [ARMED]. Note: there is no-way to stop the 2 mins strobing Note: COPY-CAT-REPLAY will playback the recorded luminary ON/OFF sequence all the time this Mode is ACTIVE. | |
| DIMMER ACTIVE | When this FUNCTION is selected icon 27 (yellow) flashes and icon 23 (amber) stays steady on, indicating that the DIMMER is being used and will remain ON until DIMMER disengages. | |
| UP | Luminary gets brighter and the "Dimmer time out" is reset to 3 secs until UPPER key is released. Note: Copy-Cat recording is active. | PRESS & HOLD UPPER |
| HOLD | Luminary stays at constant level for "Dimmer time out" (ie. 3 secs) after releasing UPPER or LOWER, or until UPPER or LOWER are depressed again, to allow further dimmer adjustments. Note: When "Dimmer time out" expires, system reverts to MANUAL Copy-Cat recording is active. | RELEASE HELD UPPER OR LOWER |
| DOWN | Luminary gets dimmer and the "Dimmer time out" is reset to 3 secs until LOWER key is released. Note: Copy-Cat recording is active. | PRESS & HOLD LOWER |
| AUTO ON/OFF | When this mode is selected the icon 25 (green) turns on for 2 secs and then turns off System monitors for human presence, with luminary turing ON or OFF as the user enters or leaves the room, respectively. COPY-CAT records the luminary activity (ie. ON/OFF sequence) while this mode is activated. NOTE: LDR monitors the ambient light level and unless there is sufficient darkness within the room the luminary will not switch on in this mode. | TWO TAPS UPPER |
| MANUAL | When this mode is selected icon | ONE TAP |

TABLE 1-continued

| FUNCTION | PREVAILING CONDITION | ACTION REQUIRED |
| --- | --- | --- |
| ON | 27 (yellow) flashes. Luminary turns and stays ON until switched OFF. AUTO mode is disabled. Note: Copy-Cat recording is active. | UPPER |
| MANUAL OFF | When this mode is selected icon 27 (yellow) flashes. Luminary turns off until switched ON. AUTO mode is disabled. Note: Copy-Cat recording is active. | ONE TAP LOWER |

Figure 3:
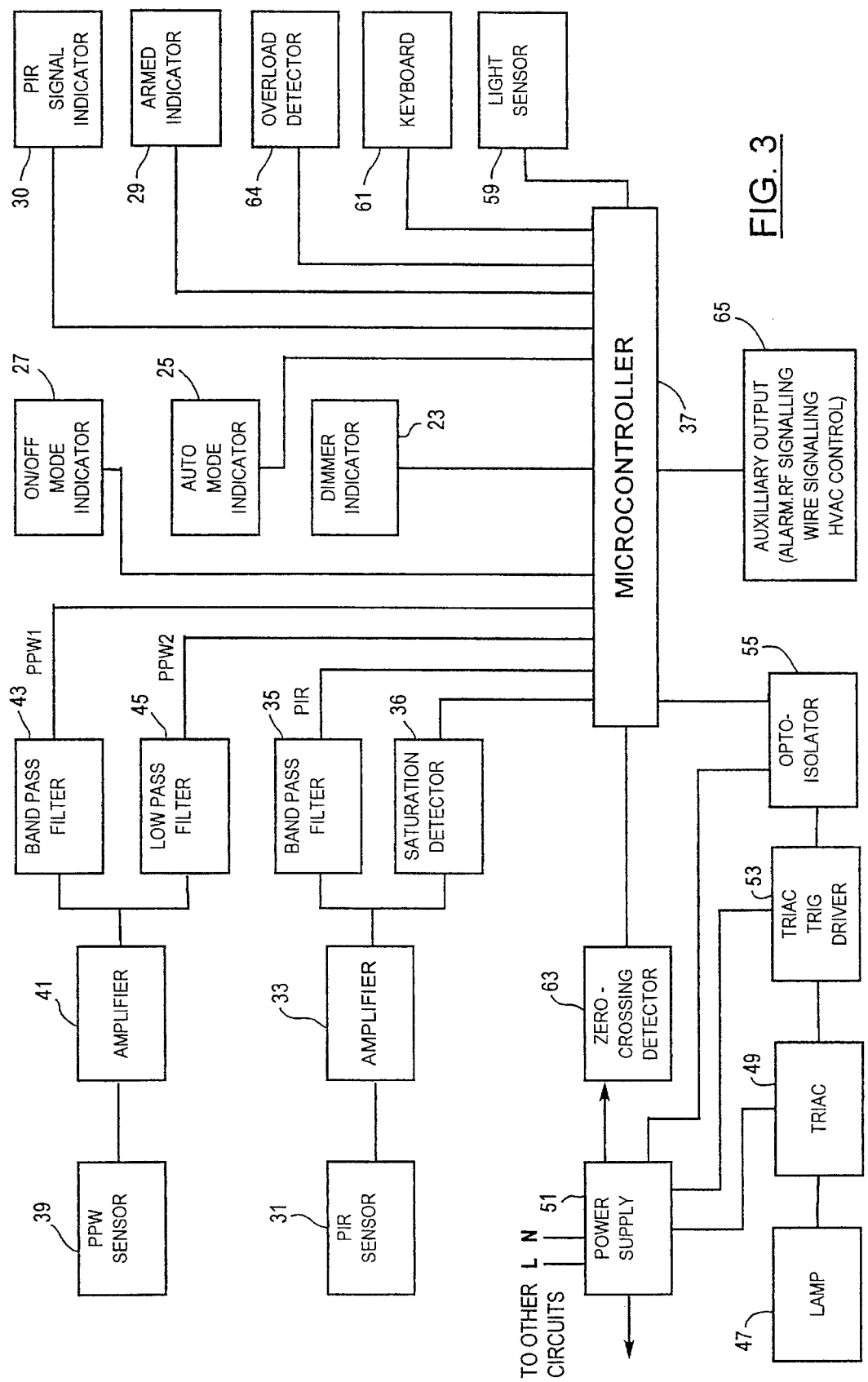
FIG. 3 is a block diagram of the functional components of the intelligent wall switch according to the present invention.

Turning now to FIG. 3, the functional blocks of the intelligent wall switch are shown. A passive infrared (PIR) sensor 31 is provided for detecting minute amounts of heat radiated by humans in the 9 μm range for distances preferably up to approximately 35 feet. Thermal radiation is focussed on the PIR sensor 31 by a custom designed fresnel multi-element lens, discussed in greater detail below with reference to FIG. 5.

The signal from PIR sensor 31 is amplified via an amplifier 33 and filtered via a band pass filter 35 for generating a PIR signal for application to microcontroller 37. Saturation of the PIR sensor 35 is detected by a saturation detector 36, for causing the last icon displayed to be illuminated. This assists a user who is in close proximity to the intelligent wall switch (ie. close enough to cause PIR saturation) to know what was the last programming mode of the switch.

The presence of a human detected by PIR sensor 31 is corroborated by a pressure pulse-wave sensor (PPW sensor 39). The signal from PPW sensor 39 is amplified via amplifier 41 and applied to a band-pass filter 43 as well as to a low-pass filter 45. The band-pass filter 43 generates a signal PPW 1 which represents the level of air disturbance in the frequency range 500–3000 Hertz which is typical of human movement (eg. breathing, rustle of clothing, etc.). The low-pass filter 45 generates a filtered signal PPW 2 which represents air pressure disturbance in the range of from 5 to 300 Hertz which is typically generated by the displacement of large objects (e.g. opening and closing of doors). The PPW 1 and PPW 2 signals are applied to microcontroller 37 for further processing.

In operation, the PIR, PPW 1 and PPW 2 signals are sampled via an integrated analog/digital converter forming part of the microcontroller 37. As discussed in greater detail below with reference to FIG. 4, microcontroller 37 implements a software algorithm for rationalizing input signals PIR, PPW 1 and PPW 2 and in response generating a weighted sum based on the steady-state levels of the input sensor signals. The microcontroller 37 implements three counters, one for each of the PIR, PPW 1 and PPW 2 signals. These counters are periodically incremented (ie. once every input AC power cycle), in response to detection of the PIR, PPW 1 and PPW 2 signals, wherein the amount of each counter increment is governed by a predetermined weighted value, as discussed below. The weighted value for each sensor is preferably different such that, in the AUTO MODE of operation, the weighted values of PIR and PPW 1 are preferably "2" and the weighted value of PPW 2 is preferably "1" (i.e. detection of an increase in the PIR or PPW 1 signal results in an increment of "2" in the corresponding counters, whereas detection of an increase in level of the PPW 2 signal results in an increment of only "1" in the respective counter). As indicated above, the microcontroller 37 calculates a weighted sum from the content of all three counters and in response generates a detection signal indicative of human presence when the weighted sum exceeds a preset threshold (e.g. 6 PIR pulses+4 PPW pulses). PIR and PPW timeout counters are also provided so that if the weighted sum does not exceed the preset threshold within a predetermined time period, the PIR, PPW1 and PPW2 counters are reset. Thus, in contrast with prior art systems, the software driven intelligent wall switch of the present invention eliminates false or spurious activation due to transient input sensor signals, rapid environmental changes, etc.

The luminary (e.g. lamp 47) is shown connected to a triac 49 which receives the power from a power supply 51, and is driven by a triac trig driver 53. AC power supply mains (live (L) and neutral (N)) are connected to the power supply 51 for receiving standard AC power. Microcontroller 37 controls illumination of the luminary or lamp 47 (either in AUTO mode, DIMMER, manual ON/OFF, ALARM mode or COPY-CAT mode) by applying a control signal to opto-isolator 55. This signal is applied to the triac trig driver 53 for controlling the conduction angle of triac 49 which thereby controls illumination of the lamp 47. An auxiliary output of power supply 51 is provided for connection to other circuits (eg. thermostats, intrusion alarm systems, etc.). The details of operation of applicant's power supply 51, triac trig driver 53 and triac 49 to control a load (e.g. lamp 47) are discussed in greater detail with reference to applicant's copending application Ser. No. 08/063,658, the contents of which are incorporated herein by reference.

As described in greater detail below with reference to FIG. 4, one aspect of the software controlled illumination of lamp 47 involves controlling the triac 49 to gradually increase the current conduction angle within each half cycle of AC power, starting from 0° and increasing up to the last current conduction angle determined from a previous dimmer setting which is automatically retained in memory of microcontroller 37. This results in the switch turning "on" the lamp 47 with a peaceful, soft brightening effect, and turning "off" the lamp 47 with a soft fade effect. Furthermore, as discussed below with reference to FIG. 4, software controlled firing of triac 49 is triggered from the zero-crossing of the AC input power signal to eliminate electric magnetic interference with other electronic apparatus and to extend life efficacy of lamp 47 (eg. incandescent lamp, halogen bulb, electronic ballast fluorescent and sodium lamp, etc.)

The intelligent switch of FIG. 3 has two wire connectors for an AC power line handling up to 500 watts load at international standard grid single phase voltages. As such, the wall switch of the present invention is adapted to be installed in standard North American, French/British, German/Swiss/Dutch/Belgian/Swedish, African, Japanese, Korean and Chinese wall-box designs for activating associated luminaries in accordance with techniques discussed herein.

The maximum current draw of the intelligent wall switch under quiescent conditions is preferably less than 20 milliamps. Maximum current draw under active operation is also minimized, with the exception that opto-isolator 55 must provide sufficient current (e.g. 30 milliamp) to fire the triac 49.

A light sensor 59 (eg. Light Dependent Resistor (LDR)) is periodically polled by microcontroller 37 to determine whether daytime or nighttime conditions exist. In the event that daytime conditions exist, microcontroller 37 blocks firing of the triac 49 so that control of the luminary by microcontroller 37 is limited to nighttime, thereby increasing energy conservation. The ambient illumination sensor 59 is preferably an LDR having a predetermined trigger threshold which can be manually set at installation (e.g. via a three position DIP switch, etc.). Furthermore, as discussed in greater detail below with reference to FIG. 4, the microcontroller can sample the sensor 59 at a predetermined rate (eg. 50 Hertz, 60 Hertz) to determine whether the light being sensed is natural or artificial. Artificial light levels oscillate at the AC line frequency (eg. 60 Hertz, 50 Hertz) which can be detected by the sensor 59, but which is too high a frequency for detection by the naked eye. In the event of detection of artificial light, the microcontroller 37 enables the various modes of operation even though the ambient light levels may exceed the above-discussed ambient light threshold level.

A keyboard 61 is shown representing the buttons 7–13 in FIG. 1 or rocker switch 17 in FIG. 2, for programming the different modes of operation of the intelligent wall switch. The various icons or illuminated legends 23–29 are also shown connected to the microcontroller 37. A further indicator (LED) 30 may be activated by the microcontroller 37 when the PIR sensor 31 is active. This further indicator may be mounted adjacent the PIR sensor behind the lens 22 (FIG. 2).

Figure 6:
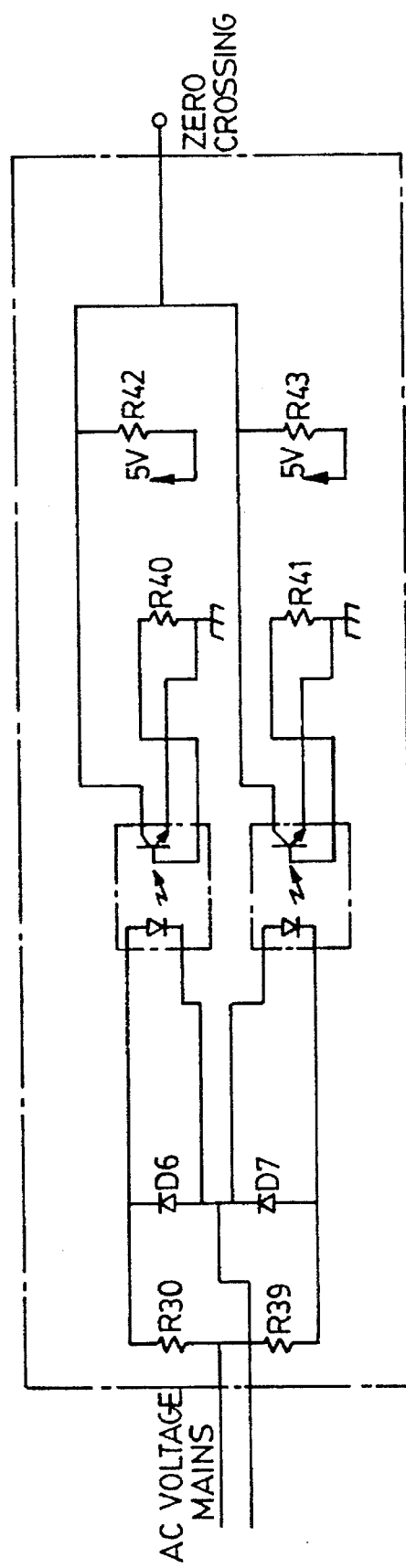
FIG. 6 is a schematic circuit diagram of a zero-crossing detector forming part of the intelligent wall switch according to the present invention.

A zero-crossing detector 63 is provided for detecting each zero-crossing of the AC power line signal and in response generating a pulse signal which is transmitted to the microcontroller 37. The microcontroller uses the zero-crossing pulse signal to synchronize firing of the triac 49 to create a smooth glow-up and glow-down of the lamp 47. A schematic circuit diagram of the zero-crossing detector is shown in FIG. 6.

An overload detector 64 is connected to microcontroller 35 for detecting, during installation, if the applied load is excessive, or if an excessive load is added during operation. The microcontroller 35 holds off normal operation of the switch in the event of detection of such an overload condition during a self-diagnostic mode of the operating software, until such time as the overload condition is eliminated.

An auxiliary output block 65 is provided for generating an alarm signal and/or an HVAC control signal via RF signalling or via a two-wire line. In the case of the alarm output, a remote security alarm system can be activated when the wall switch is operating in the ALARM mode and human presence is detected. In this case the output signal is appropriately coded to activate the alarm system. The wall switch also generates a predetermined coded signal for transmission to an HVAC central control for appropriate adjustment of ambient room temperature based on the presence or absence of humans in the vicinity of the wall switch for a predetermined length of time (eg. temperature control in hotel room).

Figure 7:
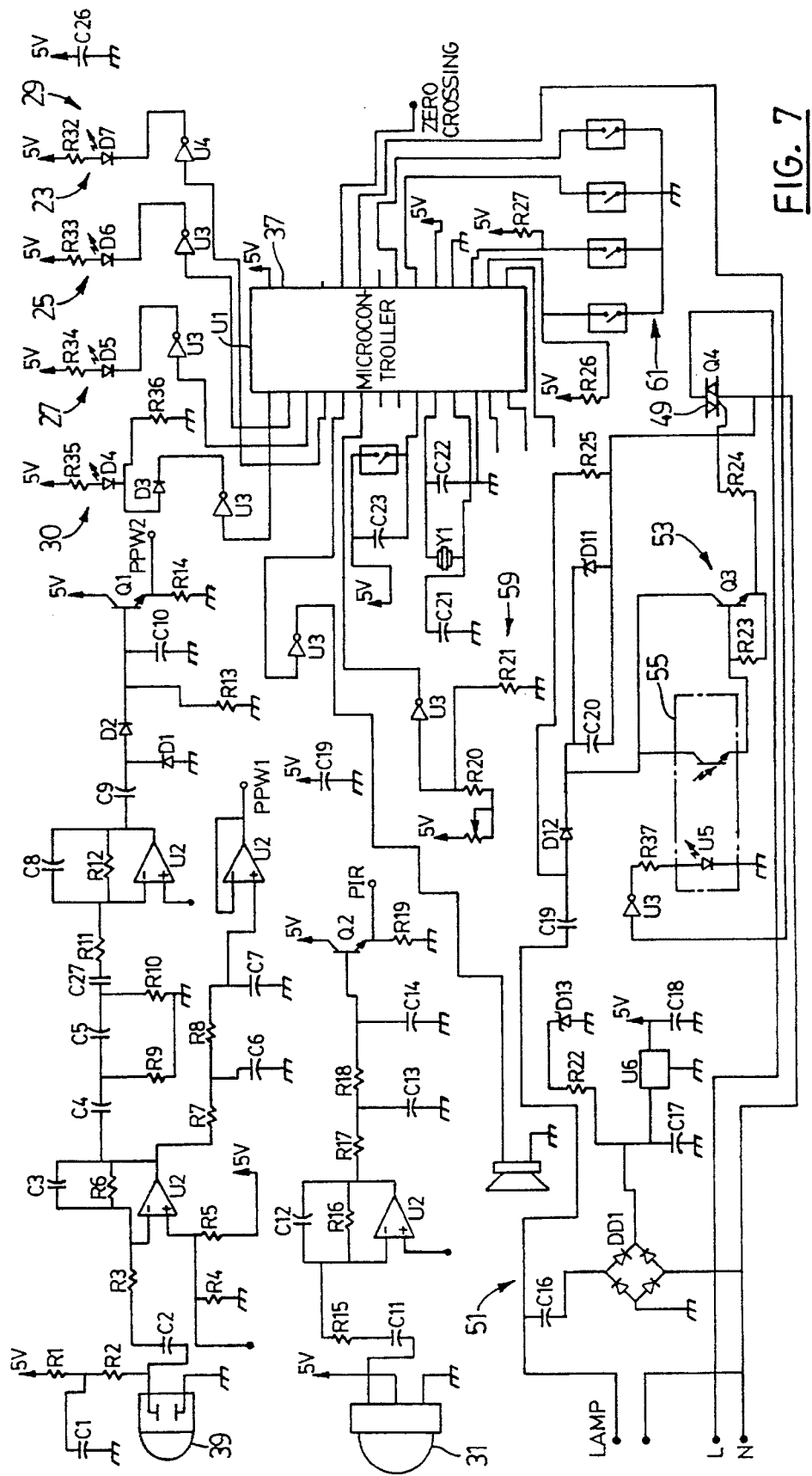
FIG. 7 is a schematic circuit diagram of the intelligent wall switch of FIG. 3.

A schematic circuit diagram of the intelligent wall switch of FIG. 3 is shown in FIG. 7.

One additional feature of the intelligent wall switch as shown in FIG. 7, is the inclusion of a tank capacitor C17 connected to voltage regulator U6 for maintaining operating power to the switch in the event of a power "burn out".

Turning now to the flow charts of FIGS. 4a to 4k, operation of the microcontroller 37 is discussed in greater detail.

Figure 4A:
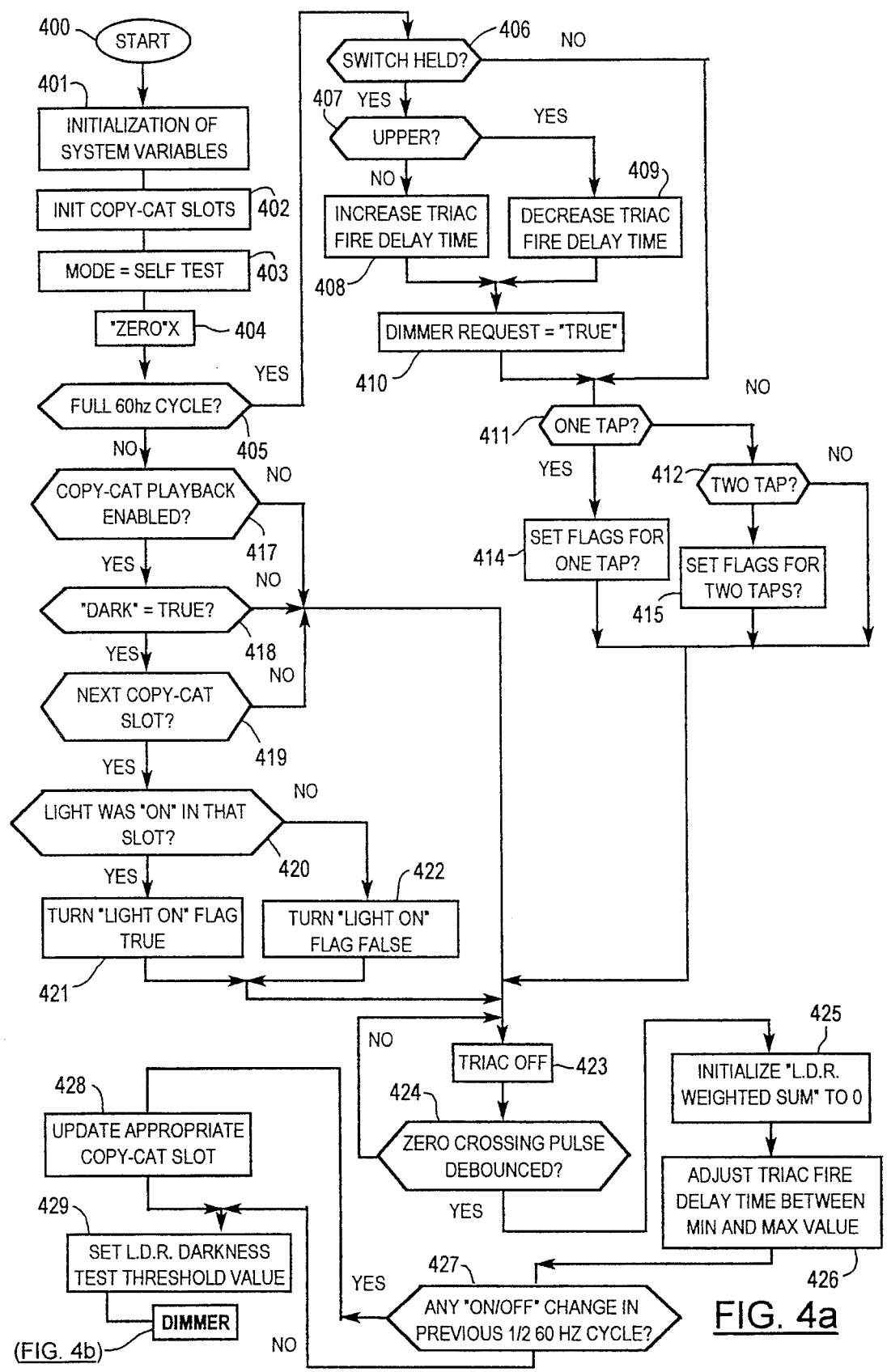

With reference to FIG. 4a, at the START of the programmed operating cycle of the intelligent wall switch of the present invention (step 400), all system variables are first initialized (step 401), such as internal time outs, counter values, etc., as discussed in greater detail below. Next, in step 402, each of the copy-cat slots is initialized to a zero value state. There are 96 bits (i.e. slots) in the internal memory of microcontroller 37 which represent 15 minute segments throughout a 24 hour time period, for the purpose of recording and replaying light switching activity (i.e. copy-cat playback).

After initializing the system variables and copy-cat slots, an internal flag is then set for self test mode (step 403).

Next, a zero crossing routine is implemented, beginning at step 404. In step 405, microcontroller 37 monitors the zero crossing detector 63 (see FIG. 3), to determine whether a full 60 hertz cycle has been received (i.e. a logic high output from the circuit of FIG. 6).

If the zero crossing detector 63 is at a logic high level (i.e. branch "yes" from step 405), then microcontroller 37 monitors the keyboard 61 (e.g. rocker switch 17), to determine whether the rocker switch is being pressed and held (step 406). If the keyboard 61 (e.g. rocker switch) is being held, microcontroller 37 then determines whether the switch is being held in the "upper" position (step 407). If the rocker switch is being held in the lower position (i.e. the "no" branch from step 407), then the triac fire delay time is increased (step 408), thereby slightly dimming the luminary output. On the other hand, if microcontroller 37 determines that the rocker switch is being held in the upper position (the "yes" branch from step 407), then the triac fire delay time is decreased (step 409), thereby slightly increasing the intensity of the luminary.

More particularly, the triac 49 is fired only once during each half cycle of the AC power signal (step 433 in FIG. 4b), and each half-cycle is divided into 256 time slots, each of which may be considered active or inactive. The triac fire delay time determines how much power is delivered to the lamp each half-cycle (i.e. the number of "inactive" slots) with an increase in the triac fire delay time resulting in less power being delivered to the lamps (i.e. a greater number of inactive slots per half cycle).

After the triac delay time has been adjusted, an internal "dimmer request" flag is set at "true" (step 410).

Microcontroller 37 then determines whether the rocker switch has been "tapped" once or twice, or not at all (steps 411 and 412) and in response sets internal flags for one tap (step 414), two taps (step 415), or not at all.

Figure 4B:
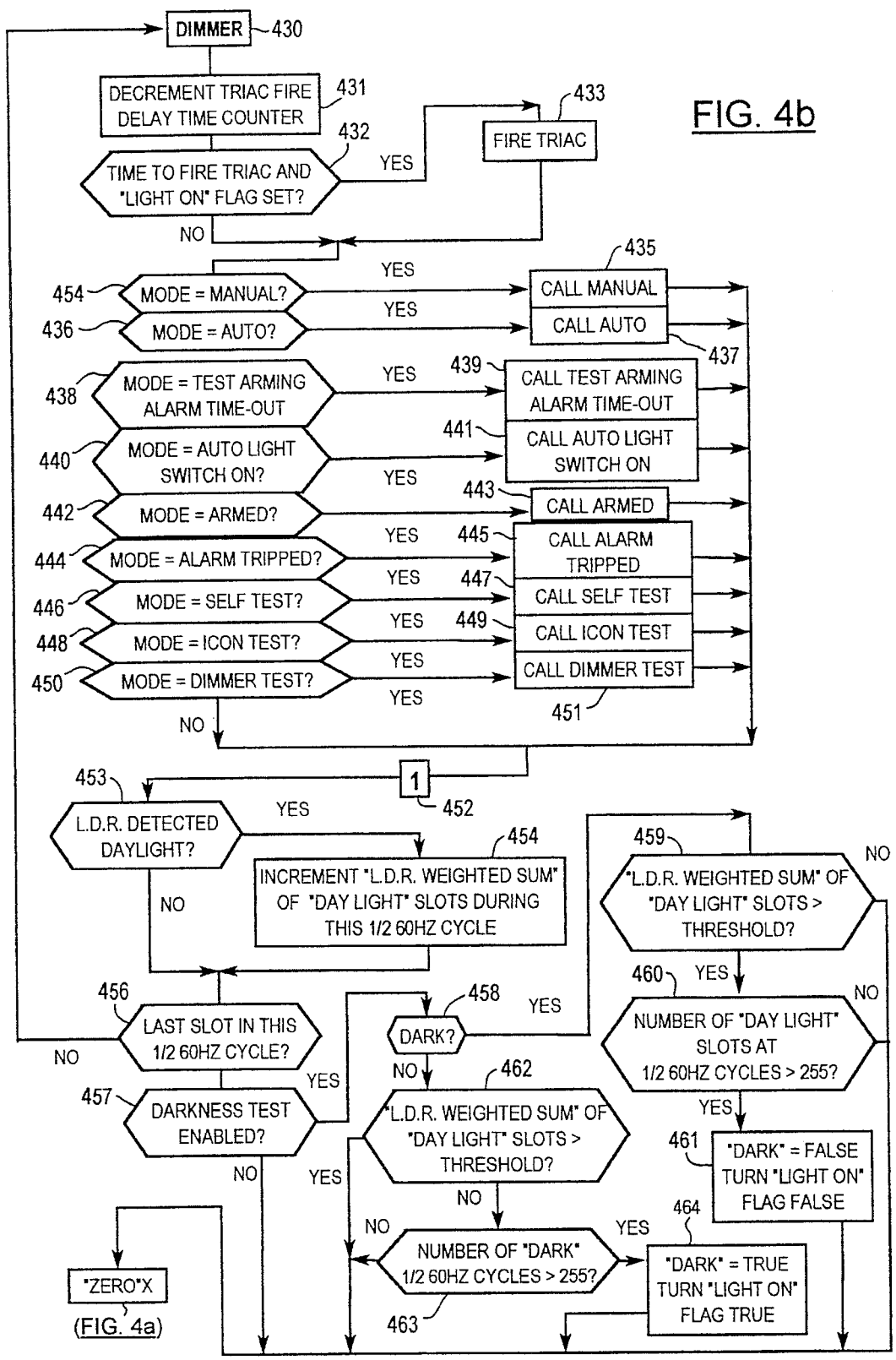
Figures 4C, 4D:
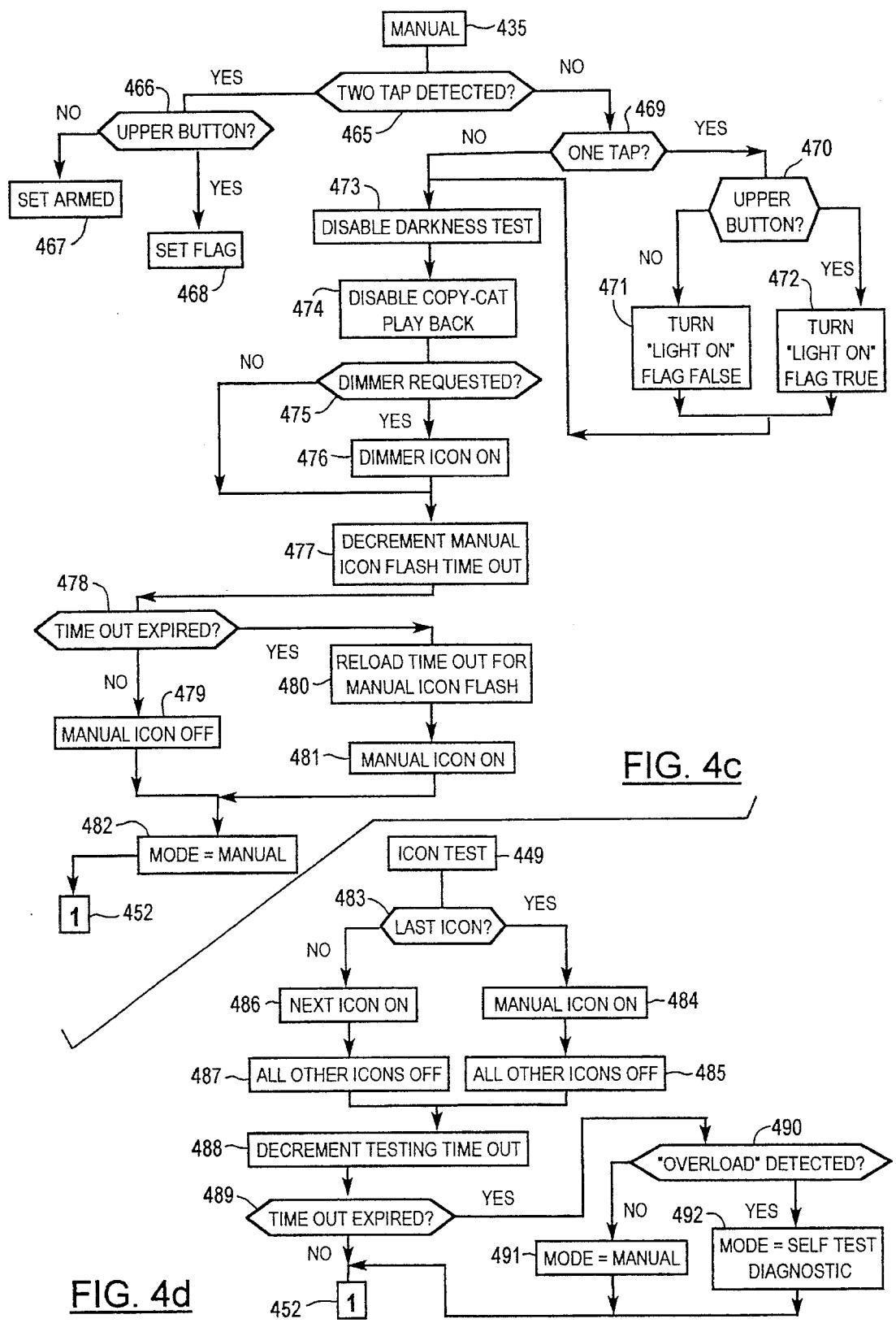
Figure 4E:
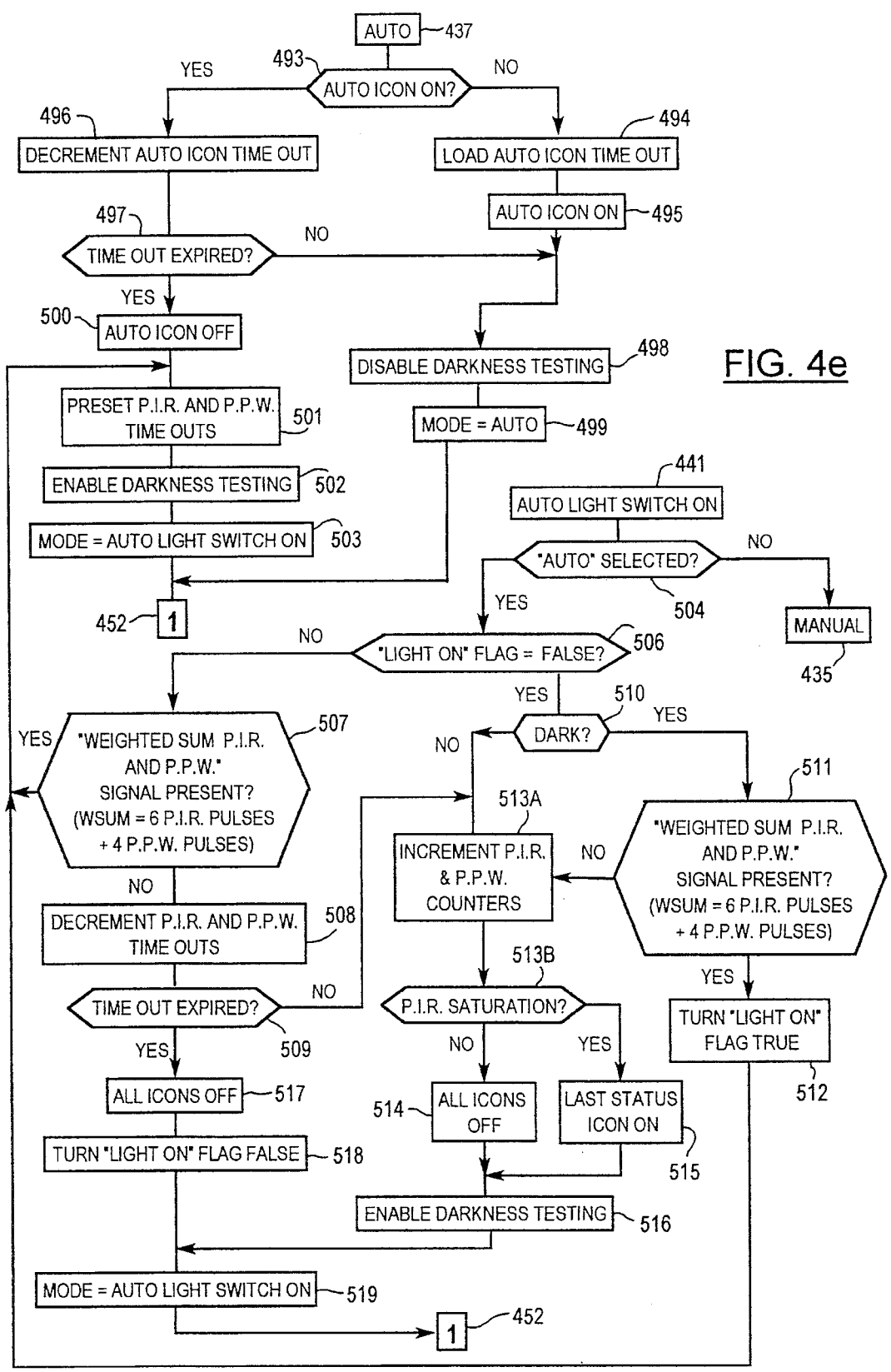
Figure 4J:
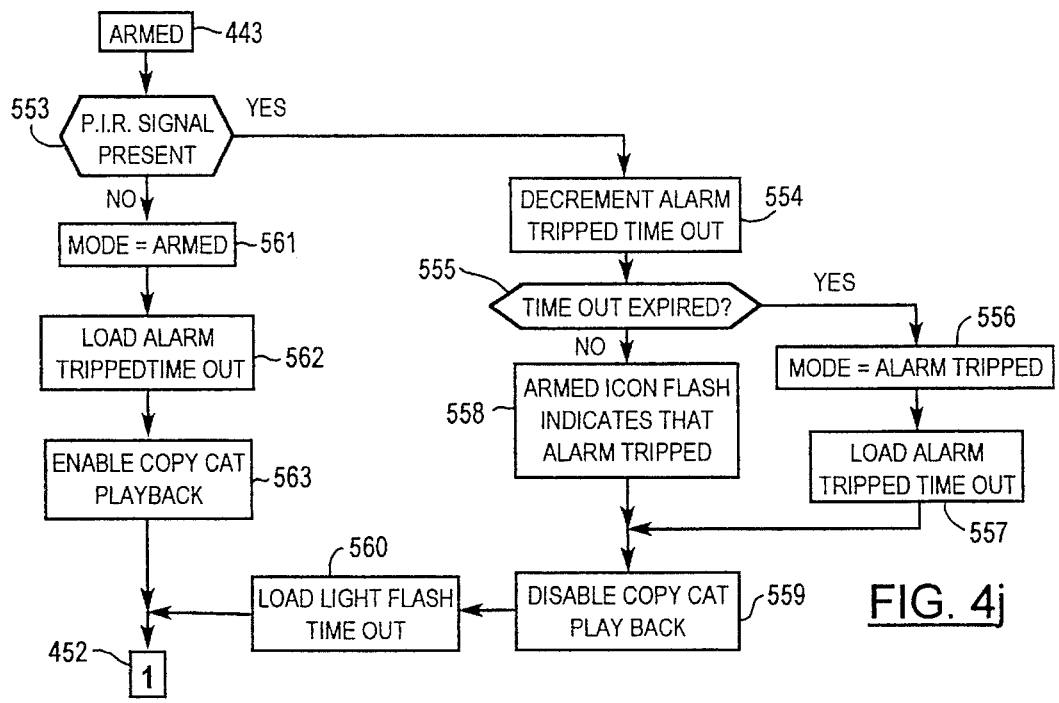

Returning to step 405, if the zero crossing detector 63 has not detected a full 60 hertz cycle (i.e. the "no" branch following step 405), then microcontroller 37 determines whether the copy-cat play back mode has been enabled (step 417—see steps 563 and 559 in FIG. 4j). If the copy-cat play back mode has been enabled (i.e. the "yes" branch from step 417), then an internal flag denoted as "dark" is queried to see if it is "true" (step 418—see steps 464 and 463 of FIG. 4b). If "dark" equals true (the "yes" branch of step 418), then microcontroller 37 determines whether the next copy-cat slot has been reached (step 419). Each copy-cat slot represents a recorded event (e.g. 15 minute slot) during a previous copy-cat recording period (e.g. 72 hours). If the microcontroller 37 determines that program flow has proceeded to the "next copy-cat slot" (i.e. the "yes" branch from step 419), then microcontroller 37 queries the copy-cat slot to determine whether the light was ON during that slot (step 420). If the light was ON during that slot (i.e. the "yes" branch from step 420), then an internal "light on" flag is set at "true" (step 421). If the light was OFF during that slot (i.e. the "no"

branch from step 420), then the "light on" flag is reset at "false" (step 422).

Program flow following any one of steps 421, 422, 414, 415, or the "no" branch from step 412, then proceeds to step 423 wherein microcontroller 37 turns the triac 49 off via opto-isolator 55 and triac trig driver 53 (FIG. 3).

Microcontroller 37 then determines whether the zero crossing pulse output from detector 63 has been debounced (step 424). More particularly, microcontroller 37 monitors the output of detector 63 to sense the actual zero crossing output pulse, looping between steps 424 and 423 until the pulse is detected indicating the debounced zero-crossing point, thereby allowing the switch operation to continue.

One feature of this invention is that by firing the triac at the zero crossing of the AC cycle, thermal stresses of the lamp filament are essentially eliminated. Thus, during lamp glow-up (i.e. dimmer function), thermal shock due to inrush of current to the lamp filament is reduced by allowing the filament to warm up gradually. This substantially increases the life efficacy of the lamp filament.

If microcontroller 37 determines that the zero crossing pulse has not been debounced (i.e. the "no" branch from step 424), then microcontroller 37 continues to disable the triac 49. If microcontroller 37 determines that the zero crossing pulse has been debounced (i.e. the "yes" branch following step 424), then an internal counter denoted as LDR WEIGHTED SUM is initialized to zero (step 425).

In step 426, the triac fire delay time is adjusted to a predetermined value between a minimum triac fire delay time of 2.8 μsec. (step 426), and a maximum triac fire delay time value of 6.0 μsec.; the predetermined value being initially the last stored value of the triac fire delay time.

Next, in step 427, microcontroller 37 determines whether there has been any ON/OFF change of the luminary or lamp 47 in the previous one half 60 hertz AC power cycle (step 427). If there has been a change in the lamp status (i.e. the "yes" branch following step 427), then this change is recorded (step 428). If there has been no change in the lamp status (i.e. the "no" branch from step 427), or after microcontroller 37 updates the appropriate copy-cat slot in the event that there has been a change in the lamp status during the previous one half 60 hertz cycle (step 428), then an LDR darkness test threshold value is set for the light sensor 59 (step 429), depending on the position of a 3-position switch connected to light sensor 59, for custom setting of the darkness threshold by the user as discussed above.

Following step 429, program flow proceeds to the dimmer subroutine of FIG. 4b (i.e. step 430).

In the dimmer subroutine, the triac fire delay time counter is first decremented (step 431). Microcontroller 37 then, at step 432, determines whether the "light on" flag has been set (steps 512 and 518 of FIG. 4e), and whether the time has occurred to fire the triac 49 (i.e. triac fire delay time counter equals zero). If both these conditions are met, microcontroller 37 fires the triac (step 433), via opto-isolator 55 and triac trig driver 53, for causing a pulse of light from lamp 47.

After firing the triac (step 433), or if it is not time to fire the triac and/or the "light on" flag is not set (i.e. the "no" branch from step 432), then microcontroller 37 tests the operating mode and calls an appropriate one of a plurality of subroutines corresponding to a predetermined one of the modes of microcontroller 37. Specifically, microcontroller 37 tests whether the mode is "manual" (step 434), in which case it calls the "manual" subroutine (step 435); and if it is not, it tests whether the "auto" mode has been set (step 436), in which case it calls the "auto" subroutine (step 437); and if it has not, it tests whether the mode "test arming alarm time out" has been set (step 438) in which case it calls the "test arming alarm time out" subroutine (step 439); and if it has not, it tests whether the mode is "auto light switch on" (step 440), in which case it calls "auto light switch on" subroutine (step 441); and if it is not, it tests whether the mode is "armed" (step 442) in which case it calls the "armed" subroutine (step 443); and if it is not, it tests whether the mode is "alarm tripped" (step 440), in which case it calls the "alarm tripped" subroutine (step 445); and if it is not, it tests whether the mode is "self-test" (step 446), in which case it calls the "self-test" subroutine (step 447); and if it is not, it tests whether the mode is "icon test" (step 448), in which case is calls the "icon test" subroutine (step 449), and if it is not, it tests whether the mode is "dimmer test" (step 450), in which case it calls the "dimmer test" subroutine (step 451).

The various operating modes of microcontroller 37 are set at predetermined stages during execution of the various subroutines, as discussed in greater detail below with reference to FIGS. 4c to 4k. Each of the "manual", "icon test", "auto", "auto switch on", "self test diagnostics", "dimmer test", "set armed", "test arming alarm time out" "armed" and "alarm tripped" subroutines return, after being called and executed, to the subroutine call return point "1", denoted by step 452.

After returning from the called and executed subroutine (step 452), microcontroller 37 determines whether the light level detected by light sensor 59 exceeds its preset threshold value (step 453). If it has (i.e. the "yes" branch following step 453), then the LDR WEIGHTED SUM is incremented (step 454). Program flow continues to step 456, wherein microcontroller 37 determines whether the current slot is the last slot of one half cycle of the 60 hertz AC signal (step 456). If microcontroller determines that the current slot is not the last slot in the current 60 hertz half cycle (i.e. the "no" branch following step 456), then program flow returns to the beginning of the dimmer subroutine (step 430). If microcontroller 37 determines that the current slot is the last slot in the 60 hertz half cycle (i.e. the "yes" branch following step 456), then microcontroller 37 determines whether "darkness test" is enabled (step 457—enabled at step 502 (FIG. 4e)). If yes, then microcontroller 37 determines whether the "dark" flag has been set at true or false (step 458). If the "dark" flag has been set at "true" (i.e. the "yes" branch from step 458), then at step 459 the LDR WEIGHTED SUM is measured against the LDR darkness test threshold value which was set at step 429 in FIG. 4a. If the LDR WEIGHTED SUM exceeds the darkness test threshold value (i.e. the "yes" branch following step 459) then microcontroller 37 determines whether the number of slots of the current half cycle for which the LDR WEIGHTED SUM exceeds the LDR darkness test threshold value is greater than 255 (step 460). If yes, then the "dark" flag is reset at false and the "light on" flag is reset at false (step 461).

If the "dark" flag is "false" (i.e. the "no" branch following step 458) the "LDR WEIGHTED SUM" of day light slots is compared against the darkness test threshold value (step 462), and if it is not, (i.e. the "no" branch from step 462), and if the number of "dark" slots of the current half cycle exceeds 255 (i.e. the "yes" branch from step 463), then the "dark" flag is set at "true" and the "light on" flag is set at true (step 464). Otherwise, if the LDR WEIGHTED SUM of "day light" slots is not greater than the LDR darkness test threshold value (i.e. the "yes" branch from step 462), or the number of "dark" slots of the current half cycle does not exceed 255 (i.e. the "no" branch from step 463), then program flow returns to the zero crossing subroutine (step 404 in FIG. 4a).

Likewise, a "no" decision at any one of the steps 457, 459 or 460, also results in program flow returning to the zero crossing subroutine (step 404 in FIG. 4a).

Thus, if, during the previous half cycle, the wall switch determined that it was "dark" in the vicinity of the switch, then program steps 459, 460 and 461 maintain the current "dark" determination provided that the LDR WEIGHTED SUM does not exceed the threshold, but the "dark" determination changes to a "false" status (i.e. it is not "dark"), if the LDR WEIGHTED SUM exceeds the threshold. Likewise, if, during the previous half cycle, the microcontroller 37 determined that it is not dark, then steps 462 and 463 maintain that condition, provided that the LDR weighted sum of "day light" slots continues to exceed the threshold for another entire half cycle, but the "dark" flag changes to "true" in the event that the LDR WEIGHTED SUM does not exceed the predetermined LDR darkness test threshold value (step 464).

Thus, according to this aspect of operation the light sensor 59 detects the difference between daylight (i.e. DC level) and artificial light (i.e. 60 Hz flicker), which cannot be done with the naked eye. At night with artificial lighting, the sensor 59 detects both darkness plus light at 60 Hz mains flicker, while during the day time sensor 59 detects sunlight DC and 60 Hz flicker if the light is also on.

It will be appreciated that the main program loop for microcontroller 37 cycles between the zero crossing subroutine (step 404 of FIG. 4a) and the DIMMER subroutine (step 430 of FIG. 4b) with calls to the appropriate subroutines of FIGS. 4c–4k, based on which "mode" of operation has been set. These subroutines will now be described in detail.

Turning to FIG. 4c, the "manual" subroutine is shown. In the manual subroutine, at step 465, microcontroller 37 determines whether internal flags have been set for indicating two taps of the rocker switch (step 415 in FIG. 4a). If two taps have been detected (i.e. the "yes" branch from step 465), then microcontroller 37 detects whether these two taps occurred on the upper button (step 466). If the lower button has been tapped twice, then the "armed" flag is set (467). If the upper button has been tapped twice, then the "auto" flag is set (step 468).

If the set flags do not indicate that there have been two taps of the rocker switch (i.e. the "no" branch from step 465), then microcontroller 37 tests the internal flags to determine whether there has been one tap (step 414 of FIG. 4a). If one tap has been detected (i.e. the "yes" branch from step 469), then microcontroller 37 determines whether it was the upper which was tapped (step 470). If the upper button has been tapped (i.e. the "yes" branch from step 470), then the "light on" flag is set at true (step 472). On the other hand, if the lower button has been tapped once (i.e. the "no" branch from step 470), then the "light on" flag is set at false (step 471). Program flow from steps 471 and 472, and from the "no" branch following step 469, then proceeds to step 473, wherein the darkness test is "disabled". Next at step 474, the copy-cat playback function is also "disabled".

At step 475, microcontroller 37 determines whether the "dimmer request" flag is true (step 410 in FIG. 4a). If dimmer has been requested (i.e. the "yes" branch following step 475), then the dimmer icon is switched on and program flow proceeds to step 477. Otherwise, program flow proceeds immediately to step 477, wherein the "manual icon flash timeout" is decremented. The "manual icon flash timeout" is initially set at 10 μsec (step 401 of FIG. 4a). If the timeout has expired (step 478), the microcontroller 37 re-loads the timeout for the manual icon flash (step 480), turns the manual icon 27 on (step 481), and proceeds to execute step 482. On the other hand, if the time out has not expired (i.e. the "no" branch from step 478), the manual icon 27 is turned off (step 479) and program flow proceeds to step 482. At step 482, the operating mode is set at "manual", and program flow returns to the main program loop at the return from subroutine call point "1" (step 452).

Turning to FIG. 4d, the "icon test" subroutine is shown, in which microcontroller 37 first tests to determine whether the last of the four icons is illuminated (step 483). If it is (i.e. the "yes" branch from step 483), then the manual icon 27 is turned on (step 484), all other icons are turned off (step 485), and program flow proceeds to step 488. If the current illuminated icon is not the last icon (i.e. the "no" branch from step 483), then the next icon is illuminated (step 486) and all other icons are turned off (step 487).

At step 488, the testing time out counter is decremented (step 488). The testing time out is initially set at 100 sec. (step 401 in FIG. 4a).

If the time out has expired, (i.e. the "yes" branch following step 489), microcontroller 37 polls the overload detector 64 to determined whether an excessive load has been applied to the system. If an overload is detected (i.e. the "yes" branch following step 490) then the operating mode is set at "self test diagnostics". If not, the mode is set at "manual" (step 491). Once the mode has been set at "manual" (step 491) or "self test diagnostics" (step 492), or if the time out has not expired (step 489), program flow returns from the subroutine call to step 452 of the main program loop.

Thus, if an overload is detected during initial installation of the switch (or during normal operation), the switch continues to cycle between the "self test diagnostics" and "icon test" modes, thereby causing the icons 23, 25, 27 and 29 to cycle in a raster pattern for alerting the user to the overload problem.

Turning to FIG. 4e, the "auto" subroutine is shown. At step 493, microcontroller 37 determines whether the auto icon 25 is illuminated. If it is not, indicating that during the previous slot, microcontroller 37 was not operating in the auto mode, the auto icon time out is loaded to a predetermined value (e.g. two seconds), at step 494. The auto icon (i.e. green icon 25) is then turned on (step 495).

If microcontroller 37 was previously operating in the auto mode (i.e. the "yes" branch from step 493), then the auto icon time out is decremented (step 496). Microcontroller 37 determines whether the auto icon time out is now zero (step 497). If the time out has not expired, the program flow continues to step 498, where darkness testing is disabled. Next, at step 499, the mode is set at "auto".

If the time out has expired, (i.e. the "yes" branch at step 497), the auto icon 25 is turned off (step 500), the PIR and PPW timeouts are re-set (step 501), darkness testing is enabled (step 502), and the mode is set at "auto light switch on" (step 503). Program flow following either of steps 503 or 499, proceeds to the return from call point 452 in FIG. 4a.

The "auto light switch on" subroutine (step 441), begins at step 504 with microcontroller 37 determining whether "auto" has been selected (i.e. via step 468 in FIG. 4d). If not, program flow branches to the "manual" subroutine (i.e. step 435 of FIG. 4d). If "auto" has been selected (i.e. the "yes" branch from step 504), then microcontroller 37 determines whether the "light on" flag is false at step 506 (see steps 461 and 464 of FIG. 4b and steps 421 and 422 of FIG. 4a). If the light was on during the previous slot (i.e. the "no" branch from step 506), then microcontroller 37 sums the output from the PIR, PPW1 and PPW2 counters to generate a weighted sum, denoted herein as WSUM. If the weighted sum of PIR and PPW values (i.e. WSUM) has reached a total of 6 PIR pulses plus 4 PPW pulses, then the predetermined threshold is deemed to have been exceeded, indicating that the light is to remain on (i.e. the "yes" branch from step 507). If WSUM does not exceed 6 PIR pulses plus 4 PPW pulses (i.e. the "no" branch from step 507), the PIR and PPW time outs are decremented (step 508), these time outs having previously been set at predetermined initial values in step 501 during the "auto" mode. If either of the PIR or PPW time outs have not expired (step 509), then program flow continues to step 513.

In the event that the "light on" flag is false, as determined at step 406, then microcontroller 37 interrogates the "dark" flag. If the dark flag is true, then microcontroller 37 determines whether WSUM is equal to six PIR pulses plus 4 PPW pulses (step 511). If WSUM equals 6 PIR pulses plus 4 PPW pulses, then the "light on" flag is set at true (step 512), and program flow returns to step 501 of the "auto" mode, wherein the PIR PPW time outs are preset to a given value.

For the purpose of the WSUM calculation mode at steps 507 and 511, the four PPW pulses can occur as any combination of weighted PPW1 and PPW2 values (e.g. two PPW1 pulses since each PPW1 pulse counts as "two", one PPW1 pulse and two PPW2 pulses since each PPW2 pulse counts as only "one", or four PPW1 pulses).

If WSUM has not reached 6 PIR pulses plus 4 PPW pulses at step 511 or WSUM has not reached this threshold at step 507 and the timeout has not yet expired at step 509, then the PIR and PPW counters are incremented in the event of PIR and PPW signals being present (step 513A) by an appropriate amount (e.g. the PIR and PPW1 counters are incremented by "2" in the event of detection of PIR and PPW1 signals, respectively, and the PPW2 counter is incremented by "1" in the event of detection of the PPW2 signal, as discussed above).

Program flow continues to step 513B, where the PIR saturation detector 36 is polled to determine whether a person is standing in extremely close proximity (e.g. within 2.5 feet of the wall switch), in which case the last lit status icon is illuminated (step 515), thereby reminding the user what the last switch setting was, without the user being required to toggle through the entire menu in order to reselect the operating mode. After step 515, program flow continues to step 516. If the PIR saturation detector 36 indicates that no-one is standing in close proximity to the PIR detector, then all icons are turned off (step 514), and program flow continues to step 516, wherein darkness testing is enabled.

If, at step 509, the PIR and PPW time outs have expired (i.e. the "yes" branch from step 509), all icons are turned off (step 517), the "light on" flag is set at false (step 518), and the mode is set to "auto light switch on" at step 519. Program flow then returns from call to step 452 of the main program loop.

Turning to FIG. 4f, the self-test diagnostics subroutine is shown comprising the steps of first loading a self-test time out counter with a preset value of preferably 100 sec. (step 520). Next, the initial triac fire delay time is loaded based on the previous value of this delay time (step 521). The manual ON/OFF icon 27 (yellow) is turned on (step 522,), and the mode is set at "icon test" (step 523).

If microcontroller 37 then determines that a key has been pressed (i.e. the "yes" branch from step 524), then mode is set at "dimmer test" (step 525) and program flow returns from call to step 452 of the main program loop.

If the microcontroller 37 determines that no key has been pressed (i.e. the "no" branch from step 524), then the self test time out is decremented (step 526), microcontroller 37 determines whether the time out has expired (step 527) and if it has not, then program flow returns from call to step 452 of the main program loop. If, however, the timeout has expired, (i.e. the "yes" branch from step 527), then mode is set at "manual" (step 528), and program flow returns from call to step 452.

Turning to FIG. 4g, the "dimmer test" subroutine is shown, beginning with microcontroller 37 determining whether the current slot is the last slot of the current one half 60 hertz cycle (step 529). If it is, then the triac fire delay time is adjusted to the previous value (step 530). The microcontroller 37 then determines whether the triac fire delay time is at a maximum (step 531). If it is, then the minimum triac fire delay time is set (step 532), and program flow continues to step 533. If the triac fire delay time is not at maximum (i.e. the "no" branch from step 531), then program flow proceeds to step 533.

If the current slot is not the last slot of the current one half 60 hertz cycle (i.e. the "no" branch from step 529), then program flow proceeds to step 533, wherein the test time out is decremented. If the time out has expired (i.e. the "yes" branch from step 534), then mode is set at "manual" (step 536) and program flow returns from call to step 452 of the main program loop. If the timeout has not expired (i.e. the "no" branch from step 534), then program flow immediately returns to the main program loop at step 452.

Turning to FIG. 4h, the "set armed" subroutine is shown, which comprises the steps of setting the arming time out delay (step 537), turning the "light on" flag to true (step 538), turning the armed or alarm icon 29 on (step 539), turning the manual, auto and dimmer icons off (step 540), and setting the mode to "test arming alarm time out" (step 541). After step 541, program flow returns to the main program loop at step 452.

Turning to FIG. 4i, the "test arming alarm time out" subroutine is shown, beginning with microcontroller 37 decrementing the arming alarm time out (step 542). This time out is initially set at 1 minute (step 401 of FIG. 4a). If the time out has not expired (i.e. the "no" branch from step 543), then the armed toggle time out is decremented (step 544). If the time out has still not expired (i.e. the "no" branch from step 545), then program flow skips to step 546. If, the time out has expired, as determined at step 545, the armed icon 29 is toggled (step 547), the toggle icon time out is reloaded to an appropriate value (step 548), and program flow continues to step 546.

At step 546, the "light on" flag is set at true, and at step 549, the mode is set to "test alarm arming time out", for returning to this subroutine following the subroutine call of step 438 (FIG. 4b).

If the time out has expired, as determined at step 543, the "light on" flag is set at true (step 550), the alarm trip hold off time out is set to 20 seconds (step 551), and the mode is set to "armed" (step 552). Program flow following a return from the "test arming alarm time out" subroutine, continues at step 452 of the main program loop.

Turning to FIG. 4j, the "armed" subroutine is shown. First, microcontroller 37 determines whether a PIR signal is present from band pass filter 35 (step 553). If the PIR signal is present, then the alarm tripped time out is decremented (step 554). As indicated at step 551 (FIG. 4i), this time out value is initially set at 20 sec. If this time out has expired, (step 555) then mode is set at "alarm tripped" (step 556), and the alarm tripped time out is loaded to 20 sec. (step 557). Program flow following step 557 proceeds to step 559.

If the time out investigated at step 555 has not expired, then the armed icon 29 is caused to flash (step 558) indicating that the alarm has been tripped. Program flow following step 558 proceeds to step 559, wherein copy-cat playback is disabled. Next, a light flash time out is loaded (step 560), to two minutes, and program flow returns from the subroutine call to step 452 of the main program loop.

If no PIR signal is present, as determined at step 553, then the mode is set to "armed" (step 561), the alarm tripped time out is loaded (step 562) and copy-cat playback is enabled (step 563). Program flow then returns to the main program loop at step 452.

Figure 4K:
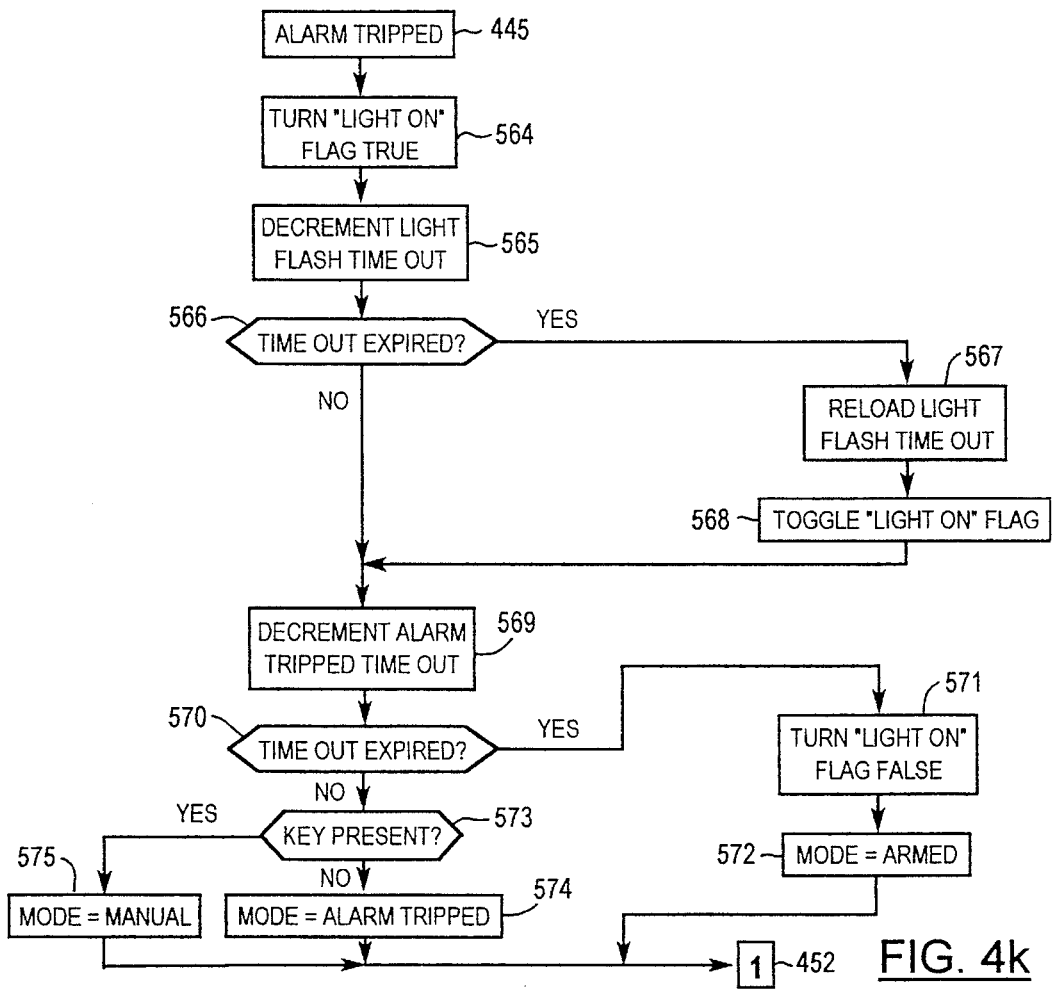

Turning to FIG. 4k, the "alarm tripped" subroutine is shown, comprising the steps of first turning the "light on" flag to true (step 564), decrementing the light flash time out (step 565), and determining whether this time out has expired (step 566). If this time out has not expired, then program flow continues to step 569. However, if the time out has expired (i.e. the "yes" branch from step 566), then the light flash time out is reloaded (step 567) and the "light on" flag is toggled (step 568). Program flow then branches to step 569, wherein the alarm tripped time out decremented. If this time out has expired (i.e. the "yes" branch from step 570), the "light on" flag is set at false (step 571) and the mode is set to "armed" (step 572).

If the alarm tripped time out has not expired (i.e. the "no" branch from step 570), then microcontroller 37 determines whether a key has been pressed (step 573). If a key has been pressed, then the mode is set to "manual" (step 575), whereas if no key has been pressed, then the mode is set to "alarm tripped" (step 574). Program flow following the return from the "alarm tripped" subroutine call, returns to step 452 of the main program loop.

Although the flow charts of FIGS. 4a to 4k depicts a succession of operational steps of the microcontroller 37 for implementing the various operating modes of the wall switch according to the present invention, it is preferred that the microcontroller 37 be implemented as a RISC (Reduced Instruction Set) programmable integrated circuit (PIC) for executing many of the functions in FIGS. 4a to 4k in parallel (i.e. simultaneously), rather than successively.

Turning finally to FIGS. 5A and 5B, a promulgated polyethylene multi-lens structure 22 is shown in accordance with the preferred embodiment, for focussing infrared radiation on the PIR sensor 31. The lenticular structure depicted in FIG. 5 comprises a matrix 71 (eg. honeycomb or other suitable shape), to which a pair of lens droplets 73 are joined, the lens droplets being constructed from the center portion (eg. three rings) of a fresnel lens, this center portion being punched out or otherwise removed from the fresnel lens and affixed to the matrix portion 71. The multi-lens structure of the preferred embodiment is capable of obtaining a field view of 125° in both horizontal and vertical directions and a range of 27 feet throughout the entire field of view. In the embodiment of FIG. 5C, the lens is shown curved, whereas in the embodiment of FIG. 5D the lens is shown flat.

other modifications and embodiments of the invention are possible of the sphere and scope of the claims appended hereto.

I claim:

1. An intelligent wall switch for controlling a luminary, comprising:

a) a pressure pulse-wave sensor for detecting air disturbances in the vicinity of said wall switch and in response generating a first sensor signal;

b) infrared detector means for detecting infrared radiation in the vicinity of said wall switch and in response generating a second sensor signal; and c) microcontroller means for (i)receiving said first and second sensor signals and in response generating first and second weighted sensor signal level values, (ii) calculating a weighted sum of said first and second sensor signal level values, and (iii) in the event said weighted sum exceeds a predetermined threshold then turning on said luminary.

2. The intelligent wall switch of claim 1, further comprising a band-pass filter connected to said pressure pulse-wave sensor for generating a first component of said first sensor signal in response to detection of said air disturbances, said first component of said first signal indicating human movement in the vicinity of said wall switch.

3. The intelligent wall switch of claim 2 further comprising a low-pass filter connected to said pressure pulse-wave sensor for generating a second component of said first sensor signal in response to detection of said air disturbances, said second component of said first signal indicating movement of a large object in the vicinity of said wall switch.

4. The intelligent wall switch of claim 3, wherein said microcontroller means further comprises:

d) first counter means for maintaining said second weighted sensor signal level value;

e) second counter means for maintaining a first component of said first weighted sensor signal value in response to generation of said first component of said first sensor signal;

f) third counter means for maintaining a second component of said first weighted sensor signal value in response to generation of said second component of said first sensor signal; and g) summing means for receiving said first and second components of said first weighted sensor signal value and said second weighted sensor signal value and in response calculating said weighted sum.

5. The intelligent wall switch of claim 4, wherein said microcontroller means increments said first counter means by two in response to detection of said second sensor signal, and increments said second counter means by two in response to generation of said first component of said first sensor signal, and increments said third counter means by one in response to generation of said second component of said first sensor signal, and wherein said predetermined threshold comprises a second weighted sensor signal level value of six plus a first weighted sensor signal value of four.

6. The intelligent wall switch of claim 1, further comprising ambient light detecting means for detecting ambient light in the vicinity of said wall switch and in the event said ambient light exceeds a predetermined value indicative of daylight then disabling said microcontroller means.

7. The intelligent switch of claim 1, further including ambient light detecting means for detecting ambient light in the vicinity of said wall switch and for differentiating between ambient natural light and ambient artificial light, and in the event of detection of ambient artificial light in excess of a predetermined value then enabling said microcontroller means, and in the event of detection of ambient natural light in excess of said predetermined value then disabling said microcontroller means.

8. The intelligent wall switch of claim 1, wherein said microcontroller means further includes means for recording operation of said wall switch over a predetermined time period and replaying said operation.

9. The intelligent wall switch of claim 1, further comprising input means for causing said microcontroller to operate in an alarm mode wherein said microcontroller means causes said luminary to flash at a predetermined rate in the event said first and second sensor signal level values exceed said predetermined threshold.

10. The intelligent wall switch of claim 1, further comprising a triac and a power supply connected to a source of AC power, said power supply having an input connected to said microcontroller means and an output connected to a gate input of said triac, said triac being connected to said luminary.

11. The intelligent wall switch of claim 10, wherein said microcontroller means selectively enables said triac at successive zero-crossings of said AC power signal in accordance with a variable conduction angle for regulating power applied to said luminary, whereby said luminary is gradually brightened in response to a gradual increase in the conduction angle of said triac and said luminary is gradually dimmed in response to a gradual decrease in the conduction angle of said triac.

12. The intelligent wall switch of claim 1, further comprising a fresnel multi-element lens for focussing said infrared radiation on said infrared detector means.

13. The intelligent wall switch of claim 12, wherein said fresnel multi-element lens further comprises a promulgated polyethylene lenticular structure.

14. An intelligent wall switch for controlling a luminary, comprising:

a) sensor means for detecting human presence in the vicinity of said switch;

b) input means for receiving a plurality of user inputs;

c) microcontroller means connected to said sensor means and said input means for:
   i) receiving a first one of said user inputs and in response directly turning on said luminary,
   ii) receiving a second one of said user inputs and in response directly turning off said luminary,
   iii) receiving a third one of said user inputs and in the event of detection of human presence by said sensor means turning on said luminary, and in the absence of detection of human presence by said sensor means turning off said luminary,
   iv) receiving a fourth one of said user inputs and in the event of detection of human presence by said sensor means flashing said luminary to signify an alarm condition,
   v) receiving a fifth one of said user inputs and in response gradually turning on said luminary, and
   vi) receiving a sixth one of said user inputs and in response gradually turning off said luminary.

15. The intelligent wall switch of claim 14, wherein said microcontroller means further includes means for recording operation of said wall switch over a predetermined time period and subsequently replaying said operation.

16. The intelligent wall switch of claim 14, further comprising illuminated legend means for indicating a plurality of modes of operation of said wall switch responsive to said microcontroller means receiving predetermined ones of said user inputs.

17. The intelligent wall switch of claim 16, wherein a predetermined one of said legend means is illuminated in response to detection of human presence by said sensor means, said predetermined one of said legend means representing a most recent one of said modes of operation of said intelligent wall switch.

* * * * *